United States Patent
Suzuki et al.

(10) Patent No.: US 6,583,529 B2
(45) Date of Patent: Jun. 24, 2003

(54) WIRING ARRANGEMENT FOR A ROTATING ELECTRICAL MACHINE

(75) Inventors: Hitoshi Suzuki; Masaki Morimatsu, both of Mori-machi (JP)

(73) Assignee: Moriyama Kogyo Kabushiki Kaisha, Mori-machi (JP)

( * ) Notice: Subject to any disclaimer, the term of this patent is extended or adjusted under 35 U.S.C. 154(b) by 87 days.

(21) Appl. No.: 09/726,954

(22) Filed: Nov. 30, 2000

(65) Prior Publication Data

US 2001/0002776 A1 Jun. 7, 2001

(30) Foreign Application Priority Data

Dec. 6, 1999 (JP) .............................. 11-345923

(51) Int. Cl.⁷ ................................................ H02K 1/00
(52) U.S. Cl. ......................................... 310/199; 310/71
(58) Field of Search ................................ 310/199, 198, 310/208, 209, 179, 191, 71, 194

(56) References Cited

U.S. PATENT DOCUMENTS

| | | | | |
|---|---|---|---|---|
| 2,874,317 A | * | 2/1959 | Couse ......................... | 310/71 |
| 4,045,718 A | * | 8/1977 | Gray ............................ | 320/17 |
| 4,211,962 A | * | 7/1980 | Grunleitner et al. ........ | 318/254 |
| 4,403,160 A | * | 9/1983 | Hibino ........................ | 310/184 |
| 5,063,314 A | * | 11/1991 | Desntis ....................... | 310/71 |
| 6,030,260 A | * | 2/2000 | Kikuchi et al. ............. | 439/890 |
| 6,091,172 A | * | 7/2000 | Kakinuma et al. ........... | 310/71 |
| 6,333,579 B1 | * | 12/2001 | Hirano et al. ............... | 310/194 |

* cited by examiner

*Primary Examiner*—Joseph Waks
*Assistant Examiner*—Thanh Lam
(74) *Attorney, Agent, or Firm*—Ernest A. Beutler (57) ABSTRACT

An electrical machine having a plurality of pole pieces surrounded by bobbins and upon which individual coil windings are formed. The bobbins are formed by a insulating material in which are embedded electrical connectors that have terminal ends that afford connection to the coil windings and to an external connection for either deriving electrical power in the case the machine operates as a generator or receiving power in the event the device operates as a motor. In addition the individual coils are arranged in groups that can be connected together through internal connections in such a way to provide different electrical outputs without internal taps or redesign of the machine. Thus, cost is reduced and at the same time the device is more compact and has greater efficiency and wider utility.

17 Claims, 7 Drawing Sheets

WIRING ARRANGEMENT FOR A ROTATING ELECTRICAL MACHINE

BACKGROUND OF THE INVENTION

This invention relates to a wiring arrangement for a rotating electrical machine and more particularly to an improved arrangement for forming the coil windings and electrical connections therefore to offer more flexibility, compactness, efficiency and lower cost.

In many forms of AC generators such as magneto generator, there is provided a stator that has a plurality of stator cores wound around individual cores. Generally, these cores consist of a number of poles and frequently the poles are wired so as to provide different electrical output terminals. For example, in many applications particularly in connection with motor vehicles driven by internal combustion engines, a plurality of stator coils are connected in series and divided into groups with intermediate taps so that the electrical power generated by respective stator coil groups can be used independently of each other. For example, it is frequently the practice to use one group having twice as many coils as the other group with one group operating electrical accessories such as light bulbs or the like that operate on 12 volts and the other group being utilized to charge the battery and provide an output of 6 volts. The ignition circuit of the engine uses the battery charge from the respective stator coil group.

However, the application of these principals and the numbers of coils utilized can vary significantly depending upon the particular application. The conventional structures employed for forming these coil windings and grouping requires individual taps and frequently soldered connections to provide the desired connections. Thus, to change from one application to another can require a completely different machine, which requires additional dyes and winding machines for winding the coils. In addition, the coils are wound around a non-conductive bobbin, which is generally formed integrally from an insulating resin, and the change in configuration requires changes in the forming dyes for the bobbin.

It is, therefore, a principal object to this invention to provide an improved stator for an AC generator wherein the changing of positions of intermediate taps to provide different coil groupings can be simplified.

It is a further object to this invention to provide a bobbin assembly for cooperation with the stator coil wherein the bobbin assembly provides a number of electrical connection terminals that can receive suitable conductors for changing the coil grouping without necessitating total reconstruction of the configuration of the winding.

SUMMARY OF THE INVENTION

This invention is adapted to be embodied in a wiring arrangement for a rotating machine comprised of a plurality of coils each wound on the pole teeth of a core through a bobbin. The bobbin has portions surrounding the pole teeth of the core. A plurality of internal electrical terminal connectors is formed on the bobbin. Coil winding ends from selected of the coils form terminals in selected of the internal electrical terminal connectors. An internal tap block is insertable in selected of the electrical terminal connectors for connecting the coil ends of two different stator coils, so that the distribution ratio of the stator coils can be varied when the internal electrical terminal in which the intermediate tap block inserted, is changed.

DETAILED DESCRIPTION OF THE PREFERRED EMBODIMENTS

Figure 1:
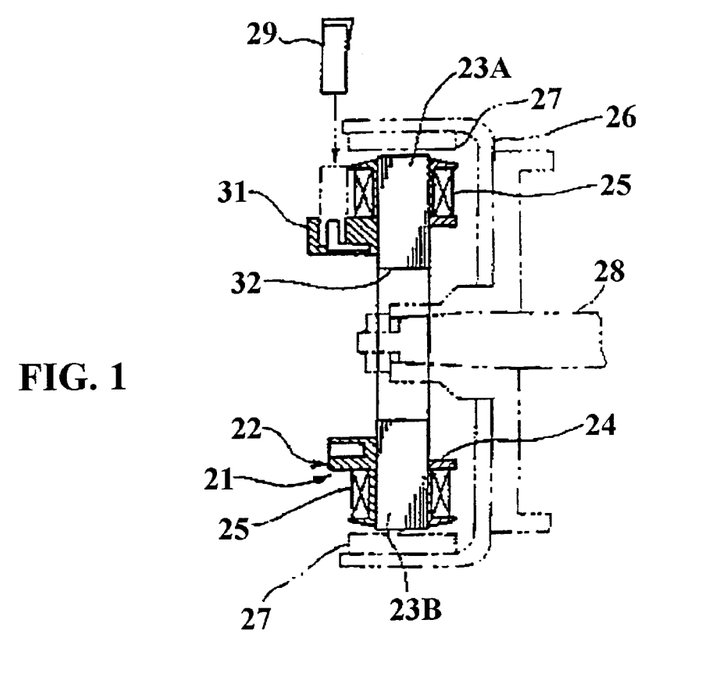
FIG. 1 is a cross sectional view taken through a rotating electrical machine constructed in accordance with an embodiment of the invention and showing, in this embodiment, the stator in cross-section and solid lines with the remaining components of the machine being shown in phantom. This view is taken generally along the line 1-0-5 of FIG. 4.
Figure 2:
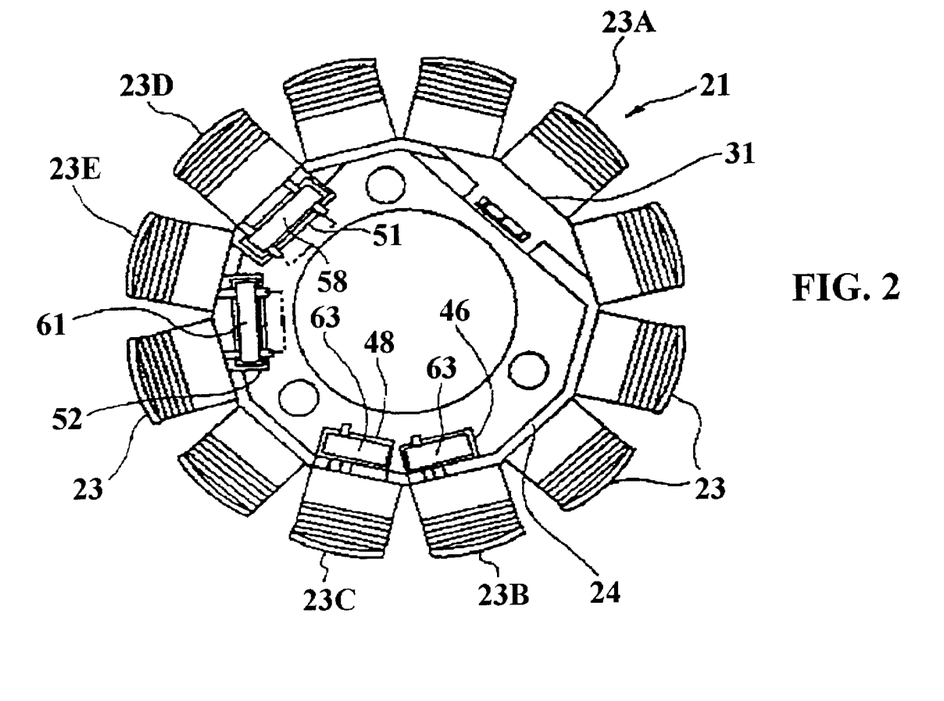
FIG. 2 is a front view of the stator.

Referring first to FIG. 1, a rotating electrical AC generator constructed in accordance with an embodiment of the invention is identified generally by the reference numeral 21. This invention deals primarily with the coil windings and terminal connections of this generator 21, which is embodied in a stator 22 having a plurality, namely 12, of pole pieces or cores 23 and associated bobbins of a bobbin assembly 24 on which coil windings 25 are wound, in a manner to be described.

The stator 22 is fixed against rotation in any suitable manner for example to the crankcase of an associated internal combustion engine. The stator 22 cooperates with a rotating cup-shape member 26 that carries a plurality of circumferentially spaced permanent magnets 27. This cup-shape member 26 is affixed for rotation with a shaft 28 such as the crankshaft of the associated internal combustion engine that rotates in the associated crankcase.

As noted, the rotating machine 21 comprises an electrical generator wherein a voltage is induced in the coil windings 25 upon rotation of the magnets 27 to provide electrical current output. Although the invention is described in conjunction with a stator, certain facets of the invention may also be employed where the rotor carries the coil windings.

From the description of the problem of the prior art contained in the "Background Of The Invention" section of the specification, it should be apparent that the invention deals primarily with the manner in which the windings 25 are associated with the cores 23 and the electrical connections therebetween. The male electrical connector for the external electrical connection appears in FIG. 1 and is identified generally by the reference numeral 29. This male electrical connector 29 cooperates with a female external terminal or connector 31 formed in a manner to be described on the stator 22 around an annular opening 32 formed therein, which a portion of the shaft 28 passes.

Figure 3:
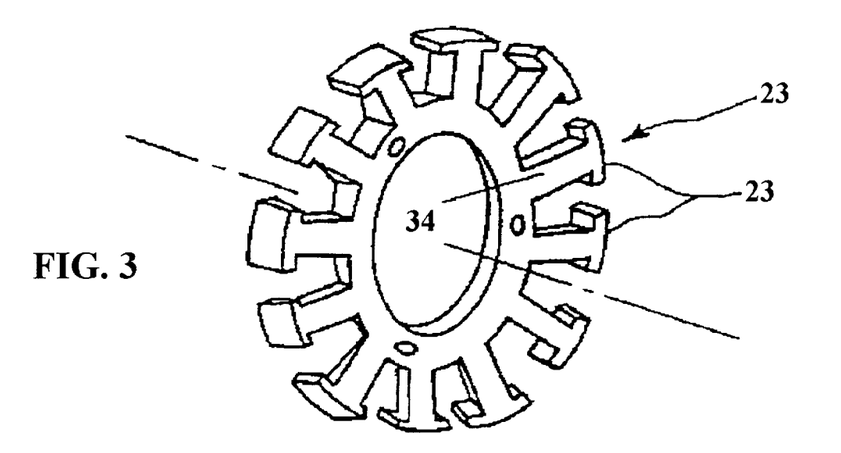
FIG. 3 is a perspective view of the stator core.

Referring now primarily to FIG. 3, the core 23 is formed of a laminated construction consisting of silicon or carbon steel plates laminated with insulating layers. This forms the plurality of cores or pole pieces 23, certain of which are numbered alphabetically, that extend outwardly from a hub portion 34. Each of the pole pieces 23 has an enlarged headed portion.

Figure 5:
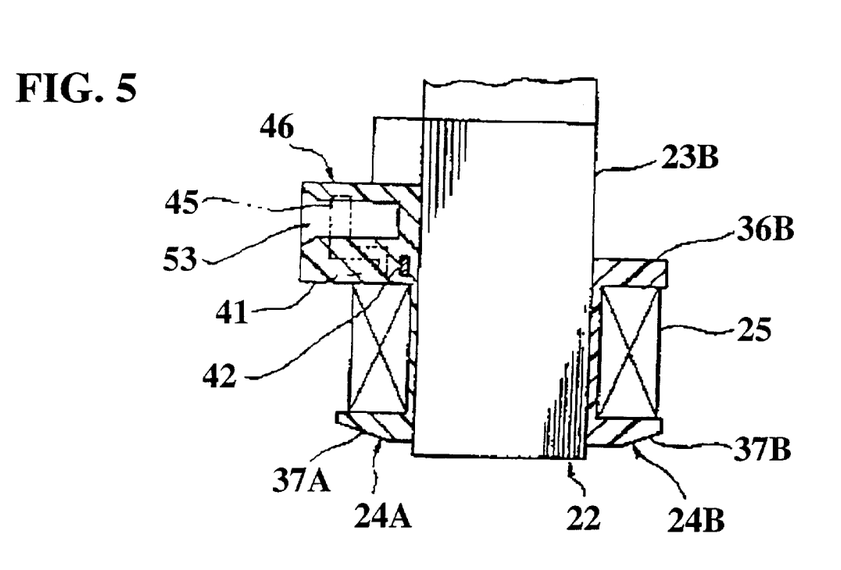
FIG. 5 is an enlarged cross sectional view taken along the line O-5 of FIG. 4.
Figure 6:
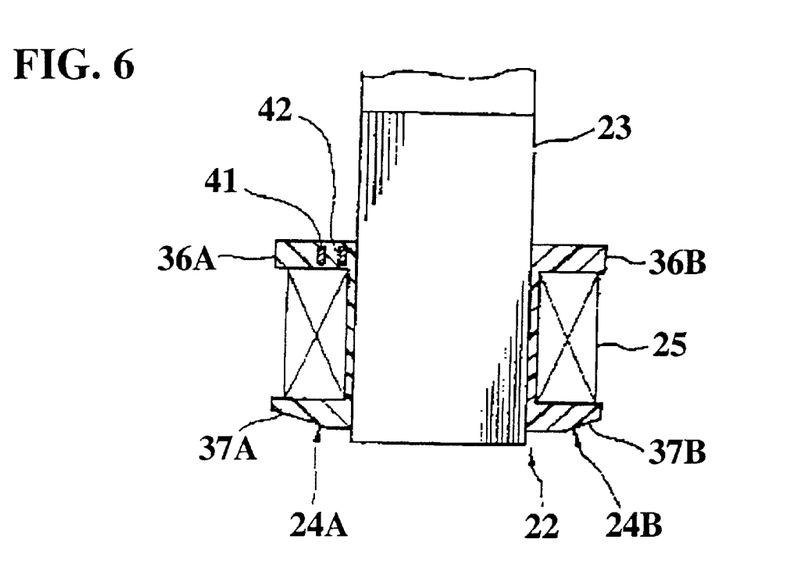
FIG. 6 is an enlarged cross section along line O-6 of FIG. 4.
Figure 7:
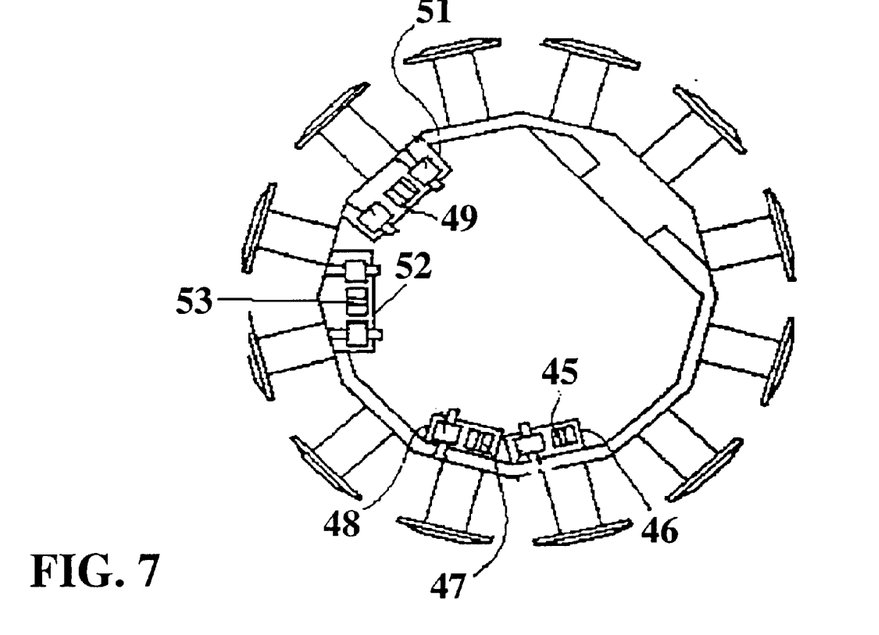
FIG. 7 is a front view of one of the bobbin halves.

As may be best seen in the cross-sectional views of FIGS. 5 and 6, the bobbin assembly, indicated generally by the reference numeral 24 is associated with the cores 23 and is formed from a pair of mating pieces or halves 24A and 24B. The bobbin halves 24A and 24B are snugly received around the pole pieces 23 and each has a pair of flanges 36 and 37 around which the individual coil windings 25 are wound in a manner which will be described. The bobbin halves 24A and 24B are made from a suitable insulating resin by injection molding.

During this molding process, a number of conductors, which may be formed from stamped metallic pieces, are embedded in one or both of the bobbin halves 24A and 24B. In the illustrated embodiment, all of these conductors are mounted in a side enlargement of the bobbin half 24A and these conductors appear best in FIG. 8.

The conductors, indicated generally by the reference numerals 39, 41 and 42, have common external, output terminals that lie in side by side relationship as best seen in FIG. 3 and which form terminal ends Y, B and W, designated as color coding of the individual conductors 39, 41 and 42, respectively. The conductors 39, 41 and 42 are formed preferably as stamped blanks of a highly conductive material such as copper. Opposite ends of these conductors 39, 41 and 42 are associated with certain of the coil windings 25 in a manner to be described so as to simplify the connections thereto and the entire electrical structure and to avoid the necessity of having soldered connections.

The external female communication terminal 31 is formed integrally with the bobbin half 24A and encircles the terminal ends Y, B and W of the individual conductors 39, 41 and 42 so as to receive the connector 29 when pressed together in a radial direction and form the desired electrical connections. This construction appears best in FIGS. 1, 2, 9 and 10.

Figure 9:
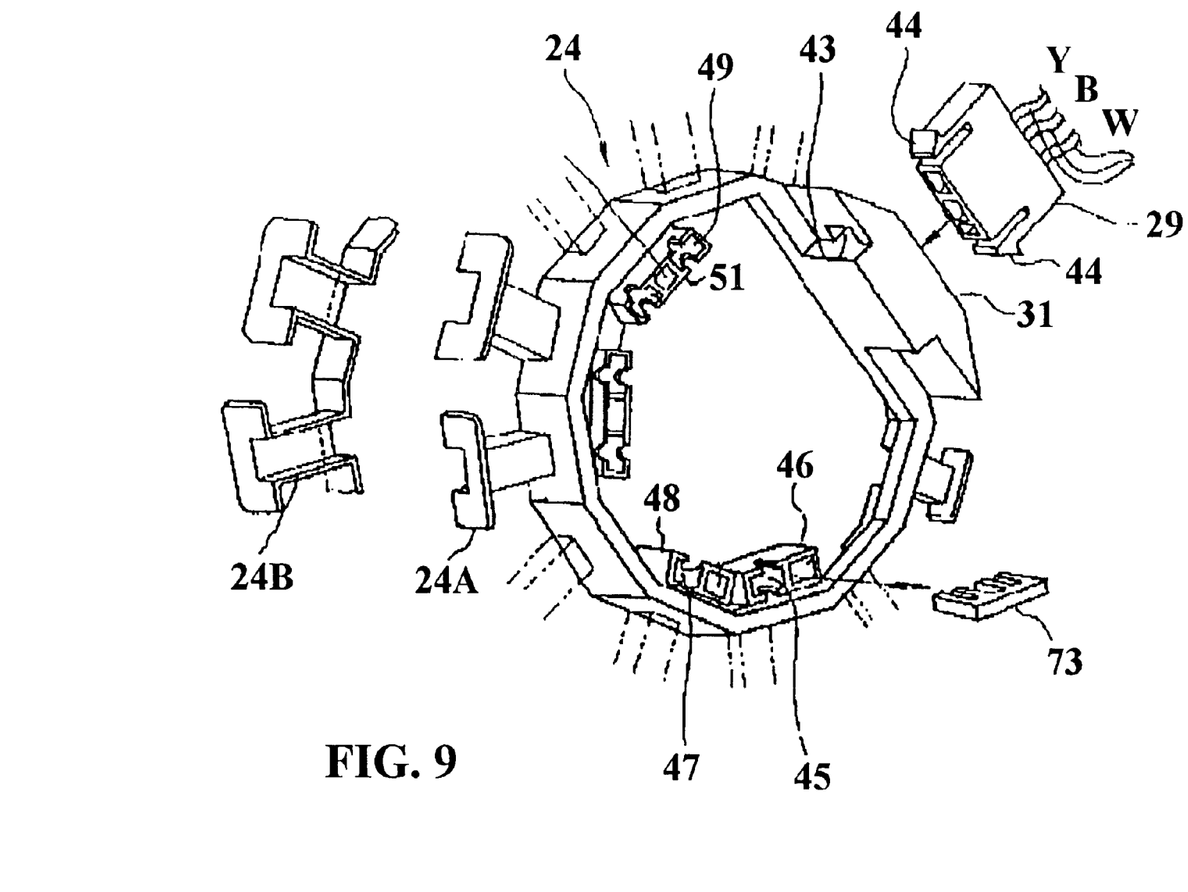
FIG. 9 is an exploded perspective view of the bobbin half shown in FIGS. 7 and 8 and showing the relation to the associated electrical connectors or terminals and the other bobbin half that is shown broken away.
Figure 10:
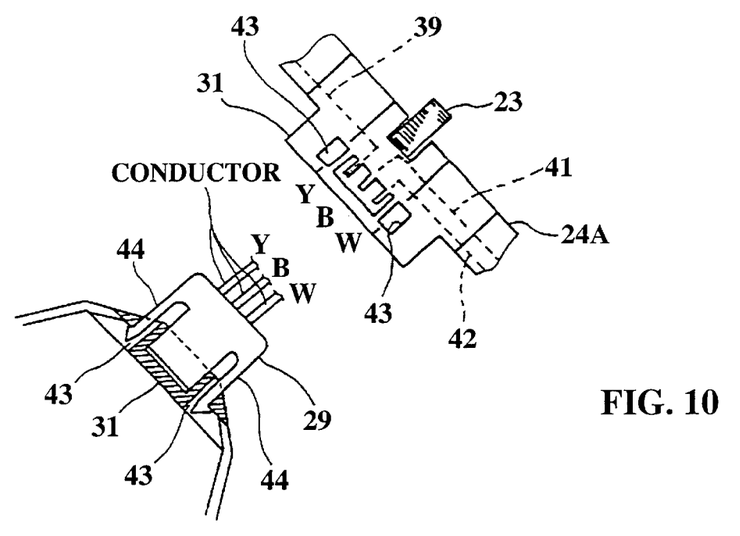
FIG. 10 is an exploded front view of the external connections and associated electrical connector shown in FIG. 9.

As may be seen, particularly from these latter two figures, the bobbin half 24A is formed with a pair of openings 43 that receive tabs 44 formed on the external male connector 29. This provides a snap together connection being made as seen in these figures. Wires Y, B and W are carried by the connector 29 and cooperate with the terminal ends of the corresponding designation. Thus, electrically power can be extracted through these conductors. This external female terminal 31 is formed adjacent a pole piece indicated at 23A, the first pole counting in a clockwise direction.

Figure 8:
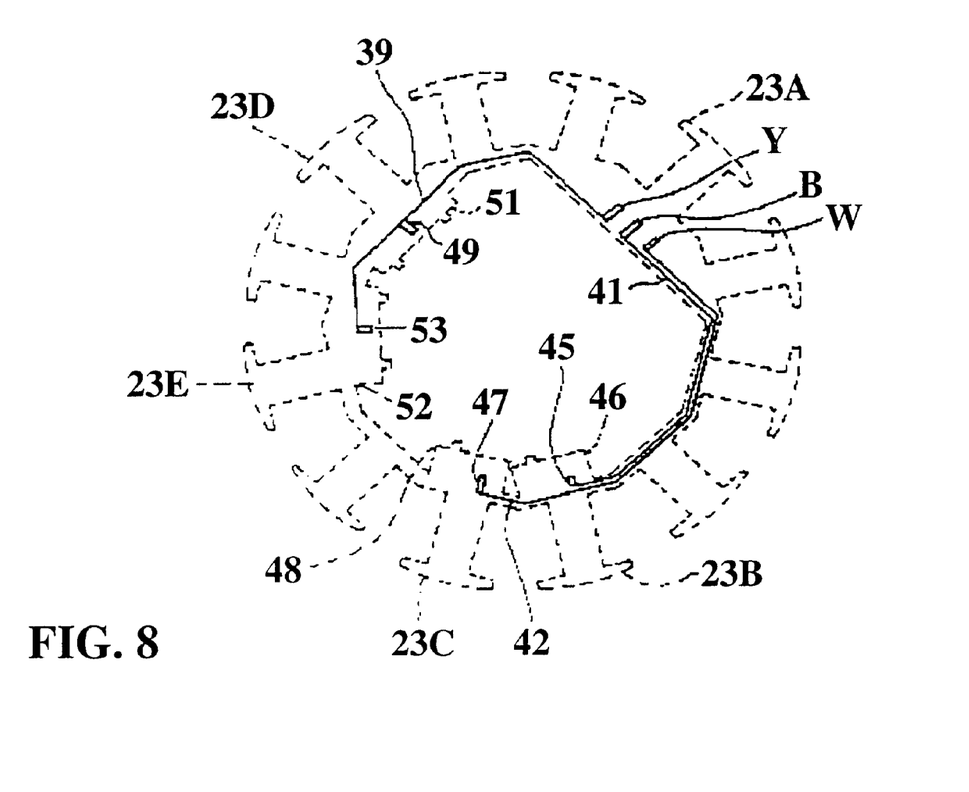
FIG. 8 is a view looking in the same direction as FIG. 7 showing the arrangement of the inserted wiring conductors in solid lines with the body of the bobbin half shown in phantom.

The conductor 41 extends from its terminal end B in a clockwise direction around the bobbin half 24A and terminates adjacent the fifth pole (23B) counting in a clockwise direction from the pole 23A at a terminal 45. This terminal 45 extends up to the base of the magnetic pole 23B and terminates in a further female electrical connector 46 formed in the bobbin half 24A and integrally with it. In a similar manner, the conductor 42 extends circumferentially around from the first pole 23A past the fifth pole 23B to the sixth pole 23C where it forms a terminal end 47. This terminal end 47 terminates in a further female electrical connector 48 formed integrally with the bobbin half 24A.

Finally, the conductor 39 extends in a counter clockwise direction from the terminal end Y to a first terminal end 49 formed adjacent the tenth pole 23D. This terminal end 49 extends to the base of the tenth pole 23D and terminates in a female internal electrical connector 51 formed by the bobbin half 24A. The conductor 39 extends past the first terminal end 49 to a further female internal electrical connector 52 where it terminates at a terminal 53.

Figure 4:
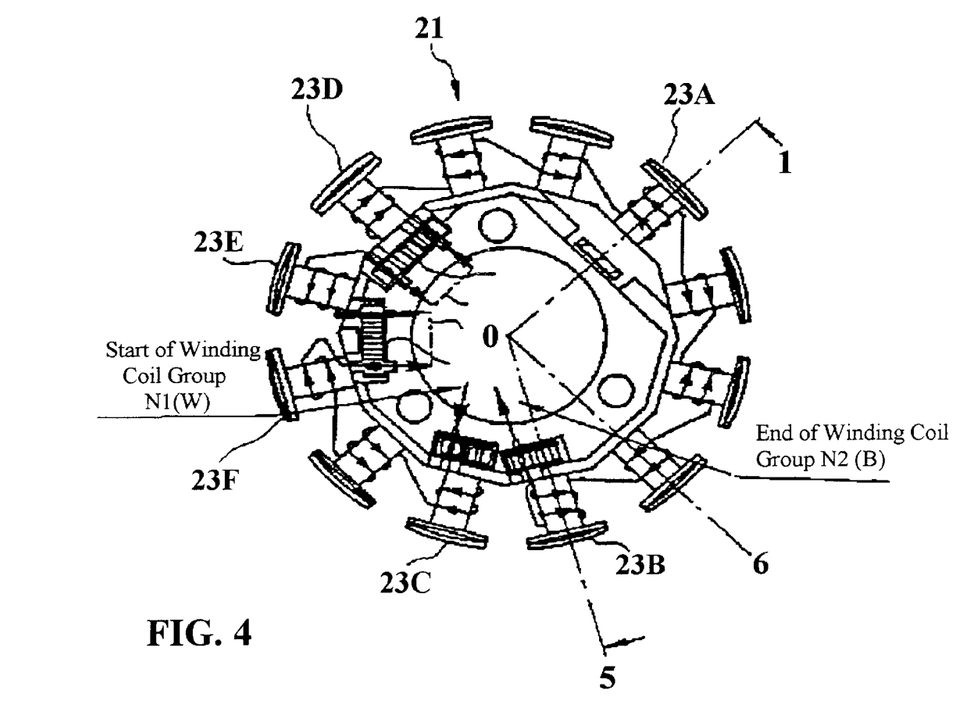
FIG. 4 is a front view of the stator coils showing the winding direction thereof.

Referring now primarily to FIG. 4, in the illustrated embodiment the twelve poles including the already mentioned poles 23A, 23B, 23C, and 23 D and their associated windings 25 are formed in three groups, the first consisting of a winding N1 which forms three coils begins at the terminal end 47 where it is connected by means of inserting it into an opening formed in a tip of the terminal end 47 thus avoiding the necessity for soldering.

This winding is then wound around the sixth pole 23C and specifically the portion of the bobbin 24 that is associated with it and then without interruption wound around the next two poles terminating at the eighth pole 23E and terminates at a conductor terminal 54 found at the base of this pole in the internal electrical connector 52. These ends are seen in FIGS. 4 and 11.

In a similar manner, a second winding N2 begins at a terminal 55 formed in the internal electrical connector 51 and is wound around the tenth pole 23D and more specifically its bobbin and the succeeding seven poles traveling in the clockwise direction to terminate at the pole 23B where it terminates in the electrical connector 46 and is connected to the terminal 45 of the conductor 42 (Black).

As has been noted, the first winding N1 consists of three coils and the second winding N2 consists of eight coils beginning at the coil 25D and ending at the coil 25B. This leaves a further coil winding which is formed around the pole 23F and which is refereed to as the coil 25F. This coil extends between a pair of terminals 56 and 57 that are formed in the internal female connectors 52 and 51, respectively. Thus, there are three coil groups consisting of the coils formed by the windings N1 and N2 and the winding group consisting of the single coil 25D.

Figure 11:
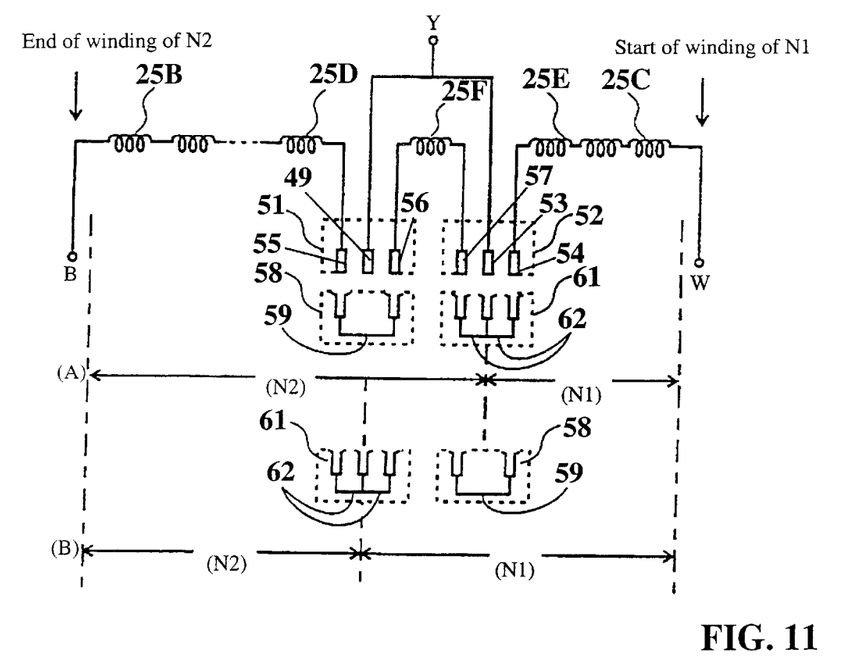
FIG. 11 is a wiring diagram showing two different ways the coil ends may be connected by internal connectors to provide two different coil groupings with the same basic stator construction.

This is shown in FIG. 11 and this figure shows how the system can be utilized with two different types of internal connectors of the male type so as to provide a coil grouping consisting of either nine coils and three coils (output ratio of 9/3) or eight coils and four coils (output ratio of 8/4) depending upon the connector that is used. The first connector arrangement (9/3 ratio) appears along the line A of FIG. 11 wherein a first connector 58 is provided with a pair of prongs and a conductor 59 which is inserted into the female connector 51 so as to establish a connection between the terminals 55 and 56 and thus place the coil 25D in with the coil grouping of the winding N2 to form nine coil windings in this group.

In a similar manner, a further conductor 61 having three female sections all connected by a common conductor or bar 62 is inserted into the internal connector 52 so as to connect the terminals 57, 53 and 55 all together and provide the desired coil groupings.

If the connectors 58 and 61 are reversed as shown in FIG. 11 in the B part of the view, then there is a different coil grouping consisting of the eight coil grouping of the second winding and the four winding group of the first winding and the coil 25D so as to provide the opportunity of having a different split in the outputs while maintaining the same overall construction.

The internal connectors 46 and 48 are closed by male tap blocks 63 that establish the electrical connections between the coil ends 25B and 25C and their respective conductor terminals 45 and 47.

Thus, merely by changing the internal male connections, it is possible to vary the output sources possible. Thus, it should be seen with this embodiment it is very simple to change the ratio of the outputs of the generator merely by utilizing two internal connectors having internal circuits that either connector or bypass the coil ends with each other.

Figure 12:
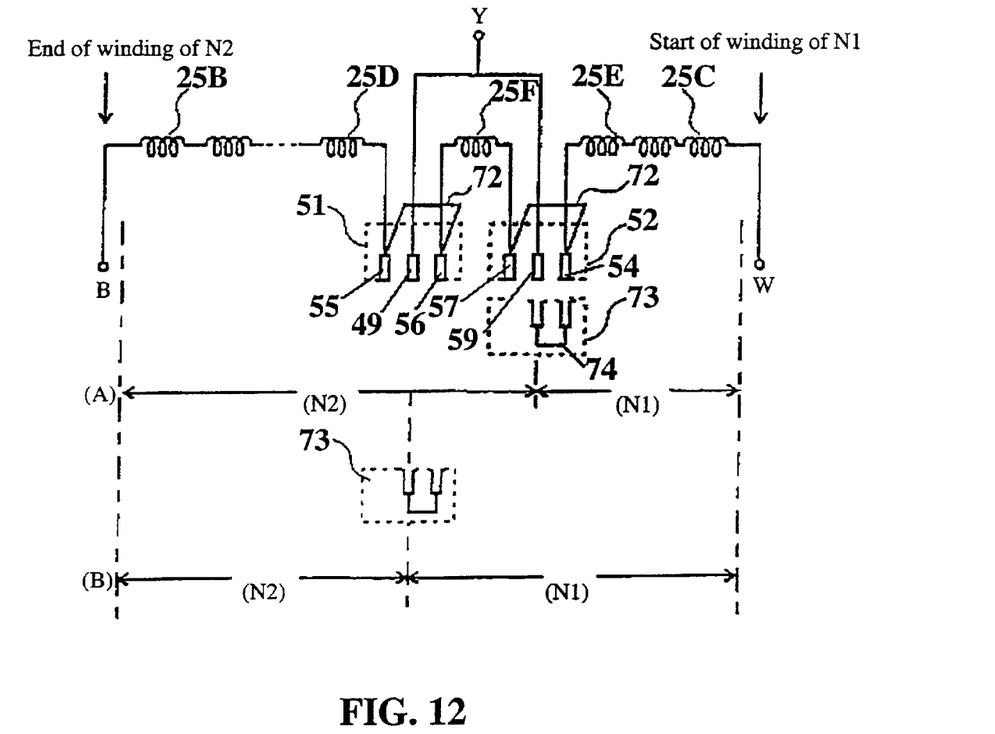
FIG. 12 is a wiring diagram in part similar to FIG. 11 showing another embodiment and how it provides two different ways the coil ends may be connected by internal connectors to provide two different coil groupings with the same basic stator construction.

FIG. 12 shows another embodiment that achieves this same result while minimizing the number of different types of internal connectors that can be utilized. Because the only difference between this embodiment and that already described is the way in which the internal connectors 51 and 52 are wired, only a figure corresponding to FIG. 11 is believed to be necessary for those skilled in the art to practice this embodiment of the invention.

FIG. 12 is such a figure and because of its similarity to the embodiments previously described, many of the components are identified by the same reference numerals and will only be described further to permit those skilled in the art to understand how this embodiment operates and can be utilized.

In this embodiment, in the internal connector 51 an internal wiring consisting of a conductor 71 bridges the terminals 55 and 56 and thus provides a connection between the one end of the coil winding 25D and the windings of winding N2 consisting of the eight coil grouping. In a similar manner, the internal connector 52 has a conductor 72 that interconnects its terminals 57 and 54 and thus provides a connection between the other end of the coil winding 25D and the winding N1 of the three-coil grouping.

A single internal female connector 73 is formed with a pair of joined terminals connected by a conductor 74. If this is placed in the connector 52 it will bridge the Y terminal 53 with the grouped coil winding and thus form a three coil output section. Thus, the remaining coils are all connected together so as to provide the 9 to 3 output ratio.

On the other hand, if the internal connector 73 is placed on the terminal 51 and bridges the terminals 49 and 56 therein, then the coil 25D is joined with the coil winding N1 and the remaining coils operate alone to provide an 8 to 4 ratio.

Thus, from the foregoing description it should be readily apparent that the described embodiments of the invention provide a very effective winding for a group of coils that permits the coils to be connected in various grouping arrangements through the use of internal connectors and without total redesign of the assembly. Of course, the foregoing description is that of a preferred embodiment of the invention and various changes and modification can be made without departing from the spirit and scope of the invention, as defined by the appended claims.

What is claimed is:

1. A wiring arrangement for a rotating machine comprised of a plurality of coils each wound on the pole teeth of a core through a bobbin, said bobbin having portions surrounding said pole teeth of said core, a plurality of electrical terminal connectors formed on said bobbin, coil windings from selected of said coils forming terminals in selected of said electrical terminal connectors, and an internal tap block insertable in said each internal wiring terminal for connecting said coil ends of the two different stator coils to said one external connection wire, whereby the distribution ratio of said stator coils can be varied when the internal wiring terminal in which said intermediate tap block is to be inserted, is changed.

2. A component of a rotating machine as set forth in claim 1 wherein the coil windings are comprised of a plurality of coil groups having continuous windings extending from terminal ends at opposite ends of each group and at least some of said terminal ends are disposed in certain of said electrical terminal connectors, said tap blocks having circuits for selectively joining selected of said coil groups into a series coil group having a number of coils represented by the sum of the coils in the joined group.

3. A component of a rotating machine as set forth in claim 2 wherein there are at least three coil groups each having a different number of coils.

4. A component of a rotating machine as set forth in claim 3 wherein there are at least two electrical terminal connectors and one end of the windings of two of the groups form terminals in one of said electrical terminal connectors and the other end of the winding of one of said two of the groups forms a terminal in the other of said electrical terminal connectors along with one end of the remaining of the three coil groups.

5. A component of a rotating machine as set forth in claim 1 wherein the bobbin is comprised of mating halves.

6. A component of a rotating machine as set forth in claim 5 wherein the bobbin mating halves encircle the pole teeth.

7. A component of a rotating machine as set forth in claim 6 wherein the electrical terminal connectors are all formed by one of the mating bobbin halves.

8. A component of a rotating machine as set forth in claim 7 wherein the coil windings are comprised of a plurality of coil groups having continuous windings extending from terminal ends at opposite ends of each group and at least some of said terminal ends are disposed in certain of said electrical terminal connectors, said tap blocks having circuits for selectively joining selected of said coil groups into a series coil group having a number of coils represented by the sum of the coils in the joined group.

9. A component of a rotating machine as set forth in claim 8 wherein there are at least three coil groups each having a different number of coils.

10. A component of a rotating machine as set forth in claim 9 wherein there are at least two electrical terminal connectors and one end of the windings of two of the groups form terminals in one of said electrical terminal connectors and the other end of the winding of one of said two of the groups forms a terminal in the other of said electrical terminal connectors along with one end of the remaining of the three coil groups.

11. A component of a rotating machine as set forth in claim 1 further including plurality of wiring conductors carried by said bobbin, each of said conductors having one terminal end terminal connected at least one of said coil ends and the other terminal end connected to one external electrical connector.

12. A component of a rotating machine as set forth in claim 1 wherein the bobbin is comprised of mating halves wherein the one of the mating bobbin halves is molded and the conductors are molded into said one mating bobbin half.

13. A component of a rotating machine as set forth in claim 12 wherein the electrical terminal connectors are all formed by the one of the mating bobbin halves.

14. A component of a rotating machine as set forth in claim 13 wherein each of said conductors has at least one terminal end terminal connected at least one of the coil ends and another other terminal end connected to an external electrical connector formed by the one bobbin half.

15. A component of a rotating machine as set forth in claim 14 wherein the coil windings are comprised of a plurality of coil groups having continuous windings extending from terminal ends at opposite ends of each group and at least some of said terminal ends are disposed in certain of said electrical terminal connectors, said tap blocks having circuits for selectively joining selected of said coil groups into a series coil group having a number of coils represented by the sum of the coils in the joined group.

16. A component of a rotating machine as set forth in claim 15 wherein there are at least three coil groups each having a different number of coils.

17. A component of a rotating machine as set forth in claim 16 wherein there are at least two electrical terminal connectors and one end of the windings of two of the groups form terminals in one of said electrical terminal connectors and the other end of the winding of one of said two of the groups forms a terminal in the other of said electrical terminal connectors along with one end of the remaining of the three coil groups.

* * * * *